No. 880,421. PATENTED FEB. 25, 1908.
A. O. TATE.
STORAGE BATTERY PLATE.
APPLICATION FILED OCT. 29, 1907.
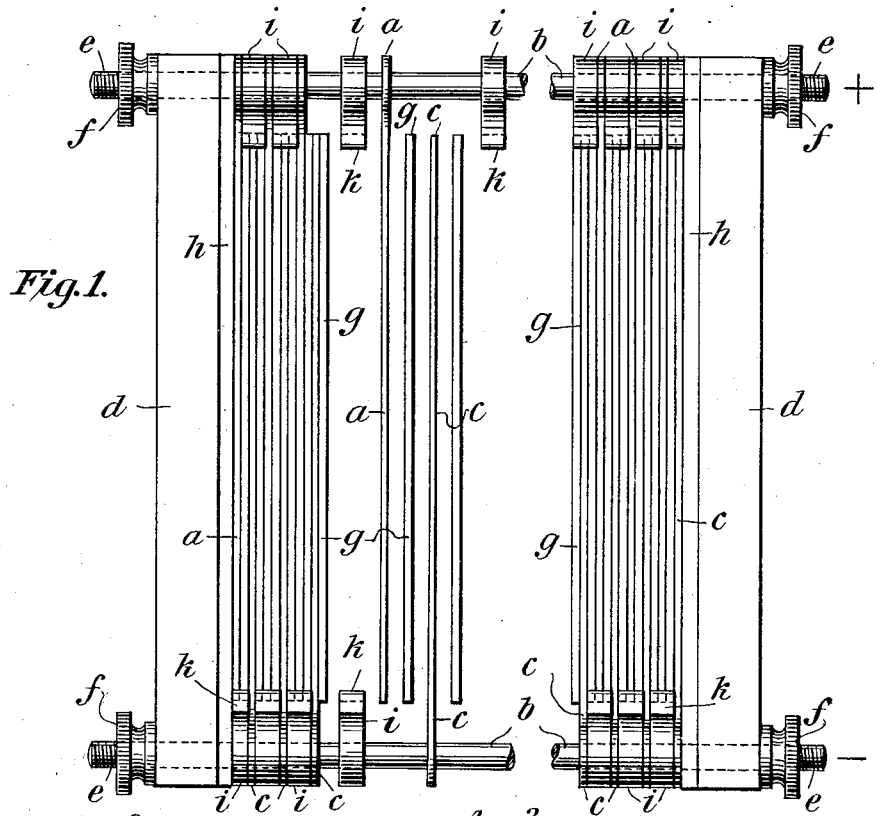
Fig.1.
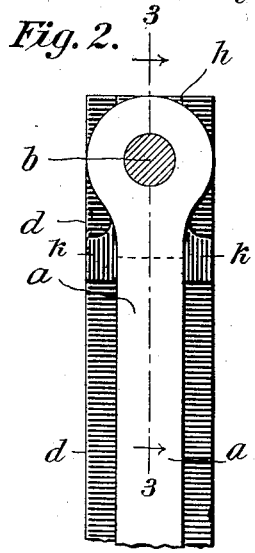
Fig.2.
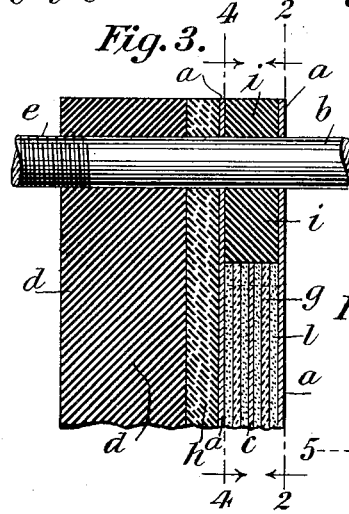
Fig.3.
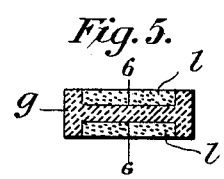
Fig.5.
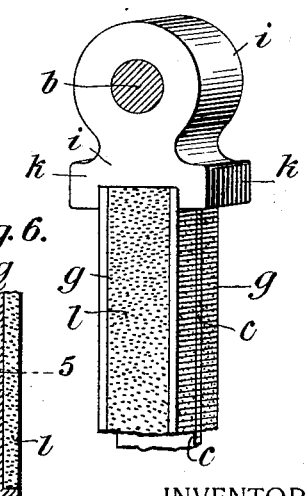
Fig.4.
Fig.6.
WITNESSES:
C. E. Ashley
M. F. Keating
INVENTOR
Alfred O. Tate
By his Attorney,
Charles L. Lintner.

UNITED STATES PATENT OFFICE.

ALFRED O. TATE, OF TORONTO, ONTARIO, CANADA, ASSIGNOR TO TATE ELECTROLYTIC COMPANY OF AMERICA, A CORPORATION OF NEW YORK.

STORAGE-BATTERY PLATE.

No. 880,421.

Specification of Letters Patent.

Patented Feb. 25, 1908.

Application filed October 29, 1907. Serial No. 399,641.

*To all whom it may concern:*

Be it known that I, ALFRED O. TATE, a subject of the King of Great Britain, residing in the city of Toronto, county of York, Province of Ontario, Dominion of Canada, have made a new and useful Invention in Storage-Battery Plates, of which the following is a specification.

My invention is directed to an improvement in storage battery plates in which the active material, such as lead oxid, is applied directly to conducting plates, grids, or the like, and known in the art generally as of the Faure type, and particularly to an improvement upon a specific storage battery plate disclosed in a prior application filed by me in the U. S. Patent Office on the 1st day of December, 1905, bearing Serial No. 289,796, and it has for its objects, first, to materially lighten the entire structure of the plate disclosed in the before-mentioned application; second, to afford a means for more effectually retaining the active material in place in the plate.

The structural plate disclosed in the before-mentioned application is of a bifunctional nature and embodies interleaved anodes and cathodes of good conducting material, preferably lead, grooved on their opposite faces so as to constitute flanges, in which grooves the active material, such as oxid of lead, is located, and thin strips of porous insulating material are located between the interleaved grooved strips or ribbons.

In the present improvement I have reversed the arrangement in respect to the grooving of the parts, in that I have grooved the opposite faces of the porous insulating strips so as to constitute chambers or cavities for the active material, and have located the interleaved anodes and cathodes on opposite faces, all of the parts being bound together in identically the same manner as disclosed in the before-mentioned application. With such a structure as disclosed herein I am enabled to materially lighten the plate, for that I may provide strip or ribbon like anodes and cathodes of a very thin structural nature, and may also effectually increase the efficiency of the plate, in that the active material is more securely or firmly held in the grooves in the opposite faces of the porous non-conducting strips.

My improvement will be fully understood by referring to the accompanying drawings, in which Figure 1 represents a side elevational view of one of my novel bifunctional storage battery plates showing the parts separated in the central part thereof, so as to better understand the manner of effectually binding all of the same together. Fig. 2 is an enlarged detail and vertical sectional view showing the interior structure, said section being taken on the line 2—2, Fig. 3, and as seen looking thereat from right to left in the direction of the arrows. Fig. 3 is a sectional view taken through Fig. 2 on the line 3—3, showing the relation of the essential parts of a complete plate. Fig. 4 is a perspective view showing one of the spacing and locking or holding blocks and the manner in which they are strung upon one of the conducting rods which constitute the poles of the plate. Fig. 5 is a transverse sectional view of one of the grooved porous strips for supporting the active material, said view being taken on the line 5—5 Fig. 6; and Fig. 6 is a vertical sectional view of the lower end of one of said strips, the same being taken on the line 6—6 Fig. 5. These Figs. 5 and 6 are made upon an exaggerated scale for the purpose of more clearly illustrating the parts.

Referring now to the drawings in detail, in all of which like letters of reference represent like parts wherever used, $a$ and $c$ represent respectively the anode and cathode strips of a complete bifunctional plate, said parts in the present instance being composed of thin narrow strips of any good conducting material, especially adapted for use in storage batteries and each enlarged at one end and provided with a hole or opening therethrough adapting it to be strung upon the proper one of the two conducting bars or rods $v, v$, the upper of said bars sustaining all of the anodes $a$ and the lower one all of the cathodes $c$. These anodes and cathodes differ from those disclosed in the before-mentioned application to the extent that they are not grooved on their opposite faces, but are simply thin flat strips, as clearly indicated in Figs. 2, 3 and 4 of the drawings.

$d, d$, are hard rubber or equivalent binding blocks for holding the entire plate together by end-pressure, and $i, i$ are insulating spacing blocks, said blocks $d, d$ and $i, i$ having cylindrical holes adapting them to be strung upon the bars or rods $v, v$ with the anode and cathode strips or ribbons $a$ and $c$. Each of these spacing blocks is provided with locking shoulders $k$, $k$ for firmly holding the parts of the plate against lateral movement when assembled and with vent holes, not shown, for venting the gases.

$g$, $g$ represents porous insulating strips, preferably of kaolin, differing in the present instance from the like strips disclosed in the before-mentioned application in that they are grooved on their opposite faces, as clearly shown in Figs. 5 and 6 of the drawings, said grooves being inclosed at their lower ends and the arrangement such that the active material $l$, such as is ordinarily used in storage batteries of the Faure type, is secured in place in the opposite grooved faces thereof.

$e$, $e$, $e$, $e$, are screw-threads upon the ends of the conducting bars or rods $v$, $v$, and $f$, $f$, $f$, $f$, are nuts for binding the parts together, acting also as binding terminals.

$h$, $h$ are sheets of soft rubber or equivalent yielding material which act as cushions and compensate for any expansion or contraction of the completed plate when in use.

All of the parts disclosed in the present application are identically the same in structure and in function as the corresponding parts disclosed in the before-mentioned application, except that in this case the active material $l$, $l$ is held in the grooves in the faces of the porous strips $g$, $g$, while the anodes and cathodes are flat conducting strips or ribbons adapted to cover the entire space between the adjacent faces of said porous strips, so that when all of the parts are secured together by the conducting bars or rods $v$, $v$ and nuts $f$, $f$ with the spacing and locking blocks $i$, $i$ in position, the mode of operation will not be substantially different from that disclosed in the before-mentioned application. But, by reason of the fact that the anode and cathode strips or ribbons $a$, $a$ and $c$, $c$, which are preferably of metal, may be much lighter and because of the fact that the active material is held in the faces of the porous non-conducting strips $g$, $g$, improved results are necessarily obtained, it being apparent that the lateral faces of the entire plate are practically plane surfaces of large porous area which will readily admit the electrolyte to all parts of the active material, and the structural relation is such that said active material will not be released under any conditions of usage.

I do not limit my invention to the specific structural arrangement of parts disclosed in the present application, as I believe my invention is generic as to a bifunctional storage battery plate of the Faure type composed of interleaved or interrelated anodes and cathodes of strip or ribbon like form, and intermediate porous insulating media provided with chambers or cavities adapted to mechanically support active material against the faces of the anodes and cathodes, said anodes being connected together at one end to a common conductor and the cathodes similarly connected at the other end, and the entire arrangement such that the active material will be entirely inclosed and held in place by virtue of the structure of the porous media.

Having thus described my invention what I claim and desire to secure by Letters Patent of the United States is—

1. A bifunctional storage battery plate, embracing interleaved anode and cathode strips or ribbons, and intermediate porous insulating media provided with chambers or cavities adapted to mechanically sustain or support active material within said cavities and against the faces of said strips or ribbons; the anode strips being all connected to a common conductor and the cathode strips similarly connected to another conductor, substantially as described.

2. A bifunctional storage battery plate, embracing interleaved anode and cathode strips or ribbons, and intermediate porous insulating strips of the same width; said porous strips being provided with chambers or cavities for sustaining active material within said cavities and against the faces of the anode and cathode strips, and the arrangement such that the electrolyte has access to the active material only through the lateral edges of the porous strips, substantially as described.

3. A bifunctional storage battery plate, embracing anode and cathode strips or ribbons, and intermediate porous insulating strips grooved on their opposite faces; in combination with active material located in said grooves and prevented thereby from being released, substantially as described.

4. A bifunctional storage battery plate, embracing anode and cathode strips or ribbons, and intermediate porous insulating strips provided with chambers or cavities adapted to mechanically support active material within the cavities; in combination with means for binding said parts together, substantially as described.

5. A bifunctional storage battery plate, embracing interleaved anode and cathode strips or ribbons separated from each other by insulating strips provided with chambers or cavities for mechanically sustaining or supporting active material within the cavities, the arrangement being such that the electrolyte has access to the active material only through the lateral edges of the insulating strips, substantially as described.

6. A bifunctional storage battery plate, embracing interleaved anode and cathode strips separated from each other by insulating strips provided with chambers or cavities for sustaining active material within the cavities and against the faces of the anode and cathode strips; in combination with means for supporting all of said parts in fixed mechanical relation with each other, substantially as described.

7. A bifunctional storage battery plate, embracing anode and cathode strips or ribbons and grooved insulating strips interleaved between the same and adapted to contain active material in the grooves, the anode strips being all connected to a common conducting bar or rod and the cathode strips similarly connected to another bar or rod; in combination with means for binding said strips in one compact mass, substantially as described.

In testimony whereof I have signed my name to this specification in the presence of two subscribing witnesses.

ALFRED O. TATE.

Witnesses:
Wm. G. Chittick, Jr.,
C. J. Kintner.